Feb. 14, 1950     L. J. JEFFRIES     2,497,550
FASTENING DEVICE
Filed June 13, 1945
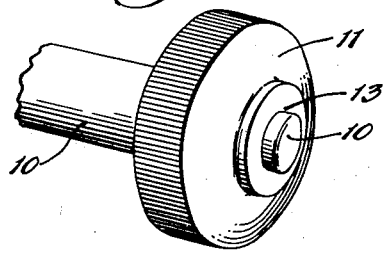
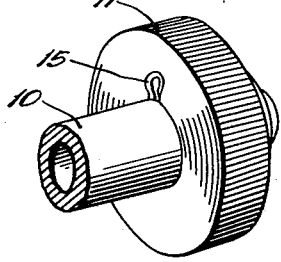
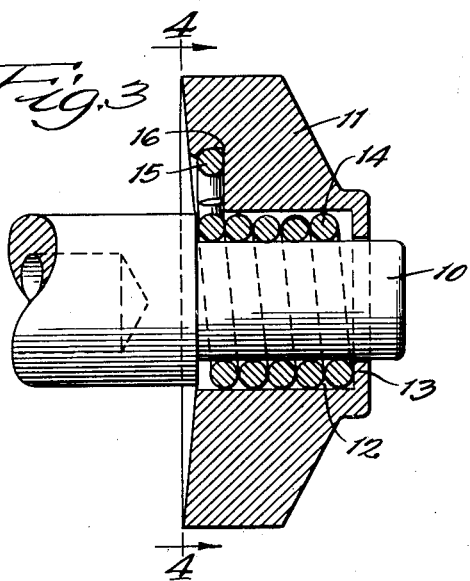
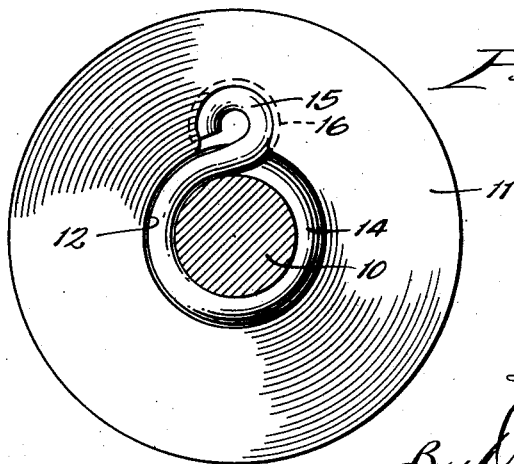

Patented Feb. 14, 1950

2,497,550

UNITED STATES PATENT OFFICE 2,497,550

FASTENING DEVICE

Leroy J. Jeffries, Elkhart, Ind., assignor to C. G. Conn, Ltd., Elkhart, Ind., a corporation of Indiana Application June 13, 1945, Serial No. 599,221

1 Claim. (Cl. 287—53)

This invention relates to fastening devices and more particularly to tension resisting fastenings for use with elongated rods, or the like.

One of the objects of the invention is to provide a fastening device which can be quickly and easily attached to and removed from a rod, or the like, without the necessity of threading it on or off.

Still another object is to provide a fastening device which frictionally grips a rod, or the like, and in which the gripping action is increased by force exerted on the fastening device.

Still another object is to provide a fastening device which is not sensitive to vibrations and will not tend to loosen or shake off in response to vibrations.

The above and other objects and advantages of the invention will be apparent from the following description, when read in connection with the accompanying drawing, in which—

Figures 1 and 2 are perspective views of a fastening device embodying the invention, taken from different angles;

Figure 3 is an enlarged axial section; and

Figure 4 is an elevation with the shaft in section on the line 4—4 of Figure 3.

The fastening device is adapted to be attached to a rod or the like indicated at 10 which may be substantially cylindrical and whose surface may be relatively smooth. It will be understood that a slight roughening of the surface will increase the gripping effect, although I have found that the fastening device will grip the rod tightly even when the rod surface is quite smooth.

The fastening device per se includes a head 11 which may be cylindrical, hexagonal or any other desired shape and which is formed with a cylindrical bore 12 therethrough of larger diameter than the rod 10. Preferably, the head is turned in, as indicated at 13, at one end of the bore to leave an opening only slightly larger than the rod 10 for appearance and to enclose the gripping parts of the device.

Within the bore 12 a coil spring 14 which is wound tightly so that its adjacent convolutions are in contact or are very nearly in contact is loosely mounted with one end adjacent the turned in portion 13 free from the head. The opposite end of the coil spring terminates in a laterally projecting eye or loop 15 which is received in a recess 16 in the inner surface of the head. After the spring is placed with the eye or loop in the recess, the sides of the recess are preferably peened over to lock the loop 15 securely to the head.

In using the fastening device the rod 10 may be forced into the spring by inserting the end of the rod into the end of the spring adjacent the loop 15 and exerting an axial force on the rod. Since the opposite end of the spring is free, the spring which is preferably normally of slightly smaller diameter than the rod can expand to admit the rod. This operation will be substantially facilitated if the head is turned slightly in a direction tending to unwind the spring although this turning is not necessary.

With the device installed on a rod as shown in Figure 3, any force on the head and the rod tending to separate them will cause the coils of the spring to bind against each other so that they are forced more tightly into engagement with the rod. Thus the more force that is exerted, the more tightly the rod is gripped so that the fastening device will withstand substantial tension forces tending to pull it off of the rod. It will be noted that anchoring of the loop 15 in the head prevents removal of the spring from the head.

To remove the fastening device from the rod it is necessary only to turn the head slightly in a direction tending to unwind the spring and at the same time to pull the head away from the rod. Turning of the head unwinds the spring sufficiently so that it will not grip the rod tightly and it can easily be slid from the rod. It will be noted that the device can easily and quickly be inserted on and removed from the rod without the necessity for threads or the like and that it will exert a tight holding force on the rod when in place. Since the spring at all times exerts a yieldingly gripping force against the rod due to the fact that it is of slightly smaller diameter than the rod, it is relatively insensitive to vibration and will not loosen or shake off when subjected to vibration.

While one embodiment of the invention has been shown and described in detail herein, it will be understood that this is illustrative only and is not intended as a definition of the scope of the invention, reference being had for this purpose to the appended claim.

What is claimed is:

A fastening device comprising a rod having a substantially smooth cylindrical surface, a head having a recess therein open at one end and of larger diameter than the rod, a cylindrical coil spring of slightly smaller internal diameter than the rod and so wound that its adjacent convolutions are substantially in contact fitting loosely in the recess, and means securing one end of the coil spring to the head at said one end of the recess, the other end of the spring being free from the head.

LEROY J. JEFFRIES.

REFERENCES CITED

The following references are of record in the file of this patent:

UNITED STATES PATENTS

| Number | Name | Date |
| --- | --- | --- |
| 534,164 | Larsh | Feb. 12, 1895 |
| 982,829 | Kemish | Jan. 31, 1911 |
| 1,800,254 | Holmes | Apr. 14, 1931 |
| 2,020,187 | Jayne | Nov. 5, 1935 |

FOREIGN PATENTS

| Number | Country | Date |
| --- | --- | --- |
| 91,452 | Austria | Feb. 26, 1923 |